United States Patent
Kirkby et al.

(10) Patent No.: US 8,453,059 B2
(45) Date of Patent: May 28, 2013

(54) TRAFFIC VISUALIZATION ACROSS WEB MAPS

(75) Inventors: Stephen Denis Kirkby, Unley (AU); Peter Kellett, Kilburn (AU)

(73) Assignee: Accenture Global Services Limited, Dublin (IE)

( * ) Notice: Subject to any disclaimer, the term of this patent is extended or adjusted under 35 U.S.C. 154(b) by 203 days.

(21) Appl. No.: 12/853,687

(22) Filed: Aug. 10, 2010

(65) Prior Publication Data

US 2011/0055710 A1 Mar. 3, 2011

Related U.S. Application Data

(60) Provisional application No. 61/238,354, filed on Aug. 31, 2009.

(51) Int. Cl.
*G06F 3/14* (2006.01)
*G06F 3/17* (2006.01)

(52) U.S. Cl.
USPC ........... 715/736; 714/764; 707/769; 709/206; 705/14.42; 705/14.66; 705/35

(58) Field of Classification Search
USPC .......... 715/200–277, 700–867; 700/701–866; 709/201–229; 705/14.42, 14.66, 35, 50–79; 345/30–111; 707/769
See application file for complete search history.

(56) References Cited

U.S. PATENT DOCUMENTS

| | | | |
|---|---|---|---|
| 5,974,572 A | 10/1999 | Weinberg et al. | |
| 6,035,330 A | 3/2000 | Astiz et al. | |
| 6,144,962 A | 11/2000 | Weinberg et al. | |
| 6,549,944 B1 | 4/2003 | Weinberg et al. | |
| 7,036,085 B2 * | 4/2006 | Barros ........................... | 715/764 |
| 7,451,103 B1 * | 11/2008 | Boyle et al. ..................... | 705/35 |
| 2006/0039293 A1 | 2/2006 | Uthe | |
| 2010/0194783 A1 | 8/2010 | Kanamaru et al. | |
| 2010/0241507 A1 * | 9/2010 | Quinn et al. ................. | 705/14.42 |
| 2011/0258049 A1 * | 10/2011 | Ramer et al. ................ | 705/14.66 |
| 2011/0289161 A1 * | 11/2011 | Rankin et al. .................. | 709/206 |
| 2012/0016904 A1 * | 1/2012 | Mahajan et al. .............. | 707/769 |

FOREIGN PATENT DOCUMENTS

| | | |
|---|---|---|
| JP | 2001-229154 A1 | 8/2001 |
| JP | 2004-280501 A | 10/2004 |
| WO | 2008024706 | 2/2008 |
| WO | 2009/041242 A1 | 4/2009 |
| WO | 2009041042 A1 | 4/2009 |

OTHER PUBLICATIONS

Chi, Ed H., "Improving Web Usability Through Visualization", IEEE Internet Computing, vol. 6 Issue 2, Mar. 2002, p. 64-71.
Pascual-Cid, Victor, "An Information Visualisation System for the Understanding of Web Data", IEEE Symposium on Visual Analytics Science and Technology 2008, Oct. 2008, p. 183-184.
Noriyuki Ouch, "Method 4: Linking Current Access to Future Access", web creators, MdN Corporation, Dec. 1, 2008, vol. 84, pp. 52-55.
"Search Report On Japanese Patent Application No. 2010-180569", dated Mar. 19, 2013, Japanese Patent Office.

* cited by examiner

*Primary Examiner* — Ruay Ho
(74) *Attorney, Agent, or Firm* — Mannava & Kang, P.C.

(57) ABSTRACT

A web traffic visualization system includes a generation module configured to generate a web map. The web map includes web objects and links connecting the web objects, where the web objects are for a web site. The web traffic visualization system also includes an acceptance module configured to assign a unique ID to a visitor of the web site and receive a visitor action performed by the visitor on a web object in the web site tagged with the unique ID. The web traffic visualization system is further configured to include a visualization module configured to generate and display the visitor action on the web map in response to receiving the visitor action tagged with the unique ID.

14 Claims, 5 Drawing Sheets

TRAFFIC VISUALIZATION ACROSS WEB MAPS

PRIORITY

This application claims priority to U.S. provisional patent application Ser. No. 61/238,354, filed on Aug. 31, 2009, and entitled "Traffic Visualization Across Web Maps", which is incorporated by reference in its entirety.

BACKGROUND

Conventional web servers track visits to their web sites. For example, a web server may track statistics, such as number of visitors, page views, user sessions, etc. of a web site it hosts. A web site owner may desire to view these statistics and other statistics to determine how their web site is being used and to determine whether visitors are accessing web pages or objects on web pages. For example, for an on-line shopping web site, the web site owner may desire to know whether a particular landing page is driving visitors to make purchases or access certain product information. Based on this information, the web site owner may try to modify the web site to increase sales.

Conventional programs tracking these statistics, however, typically do not present the statistics in a manner that makes the information easy to understand and also do not allow the web site owner or administrator to quickly realize what visitors are actually doing on the web site. Typically, the statistics are captured in a log file, and the log file is accessed to present the statistics as values or possibly in a bar graph or some other chart format. When presented in this manner, it is difficult to determine how visitors are navigating through a web site and whether the visitors are performing actions desired by the web site owner based on their navigation throughout the web site.

SUMMARY OF THE INVENTION

According to an embodiment, a web traffic visualization system includes a generation module, an acceptance module and a visualization module. The generation module is configured to generate a web map including web objects and links connecting the web objects, wherein the web objects are for a web site. The acceptance module is configured to assign a unique ID to a visitor of the web site and receive a visitor action performed by the visitor on a web object in the web site tagged with the unique ID. The visualization module is configured to generate and display the visitor action on the web map in response to receiving the visitor action tagged with the unique ID.

According to another embodiment, a method for generating a visualization of web traffic information for a web site comprises generating, by a computer system, a web map including web objects and links connecting the web objects, wherein the web objects are for a web site. The method also includes assigning a unique ID to a visitor of the web site; receiving a visitor action performed by the visitor on a web object in the web site tagged with the unique ID; and generating the visitor action on the web map in response to receiving the visitor action tagged with the unique ID. The method also includes displaying the visitor action on the web. The method may be embodied in a computer program stored on a non-transitory computer readable medium. The program may be executed by a computer system to perform the method.

BRIEF DESCRIPTION OF DRAWINGS

The embodiments of the invention will be described in detail in the following description with reference to the following figures.

DETAILED DESCRIPTION OF EMBODIMENTS

Figure 1:
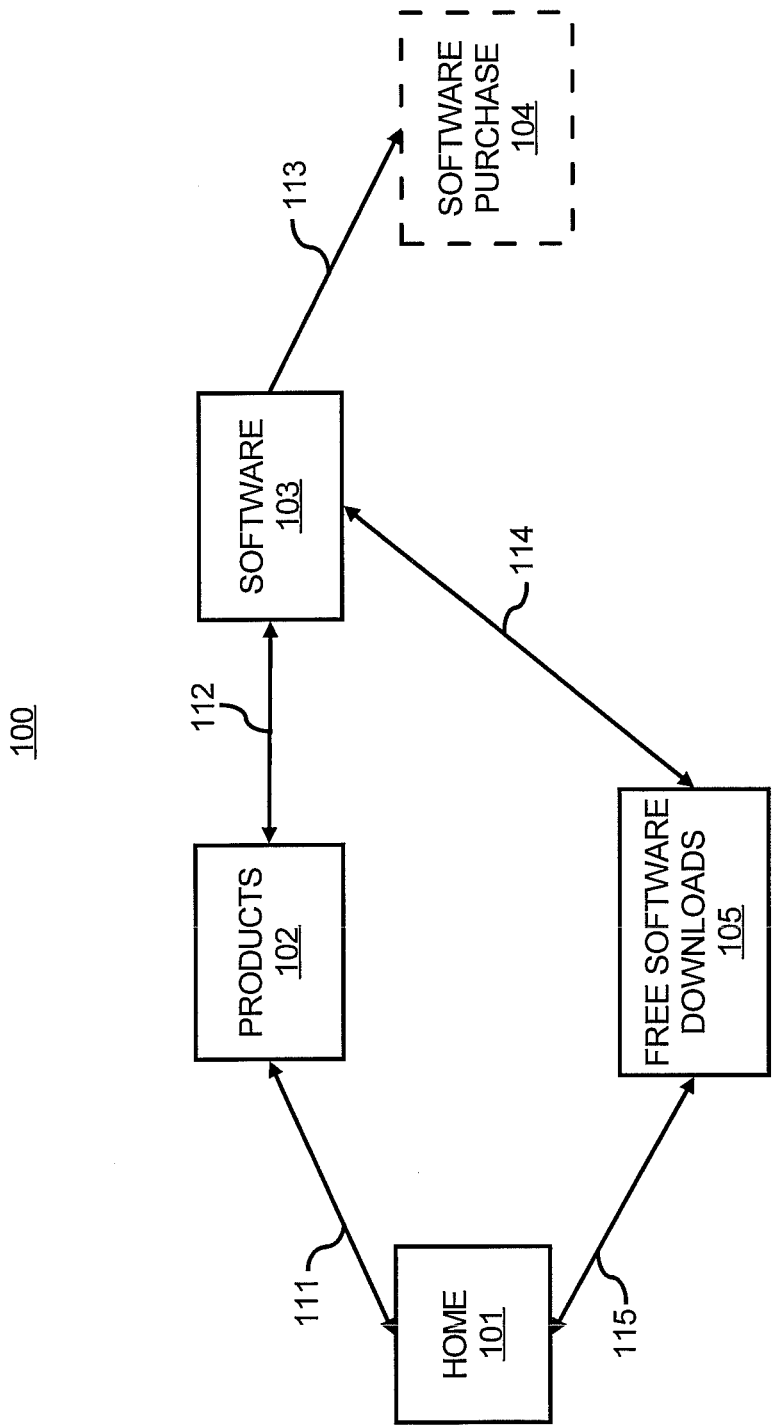
FIG. 1 illustrates an example of web map, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. Overview

According to an embodiment, a web map visualization system is configured to provide a real-time visualization of web traffic for a web site. Information is captured for visitor actions performed when navigating through a web site. The captured visitor actions are sent to a web server, for example, as they are captured, and a visualization of the captured actions is generated. The visualization is provided on a web map of the web site and provides a fast and easy means to quickly identify visitor actions performed on the web site and how web traffic is flowing through the web site. Also, the visualization may be generated as the visitor actions are captured and the visualization is dynamic in that the displayed information is varied as the visitor actions vary to provide a visualization of web traffic flow on the web site as the web traffic flows. The visualization may include an animated visualization to show the flowing of the web traffic and the visitor actions.

2. Web Map

As described above, according to an embodiment, a visualization of web traffic is provided on a web map. One embodiment for generating the web map is described in U.S. Pat. No. 7,428,705, entitled "Web Map Tool", which was granted on Sep. 23, 2008, and which is incorporated by reference in its entirety, and is described below.

A web map is a representation of one or more web sites, or parts thereof. A web map can be created by scanning one or more web sites, examining web objects encountered on the one or more websites, and recording a linking structure associated with the web objects. Examples of the web objects include any document that may exist on the one or more web sites. This includes, but is not limited to, plain text, hypertext, images, audio, video and other multimedia objects, executable applications and database information. The web objects may be static files or database entries residing on a machine hosting the one or more web sites, or the web objects may be dynamically generated by the one or more web sites as needed.

Each web object may be represented in a web map by a node, which can be an icon, symbol, shape or text in the representation. Often, the node is labeled with a filename, a title, or a URL of the associated web object.

The nodes representing the web objects are connected by links. One or more links between a pair of web objects can be represented in a web map by an "edge", which is drawn as a line between the associated nodes. Typically, an arrowhead is placed on the line to indicate the "direction" of the link from the object containing the link (called the source of the link) to the object referenced by the link (a URL, called the destination of the link). If there are links running in both directions between a pair of the web objects, the corresponding edge may have arrowheads on both ends. A "directory distance" between the pair of web objects is given by the length of the shortest path between the pair of web objects in the directory structure of the web site. For example, "www.abc.com" and "ftp.abc.com" would be in the same virtual directory, namely ".abc.com", and ".com" is a common grandparent directory. A "link distance" between two web objects is the length of the shortest path between the two objects in the linking structure (e.g., web map) of the web site.

Information in the web map may be totally or partially generated in a web mapping system by interrogating a web site to obtain data describing web objects and links, and attributes of the web objects and links. Alternatively web site information may be provided by a third party computer program which is responsible for collecting page and link information relating to one or more web sites, and then either sending the information to web maps generated according to the present invention, or allowing the web maps to have on-demand access to the information through an application programming interface. Examples of a third party program include: spreadsheet software; graphics software; a spider-based site crawler that uses the HTTP protocol to gather web site information, including page and link information; a FTP site crawler that uses the FTP protocol to gather web site information; or a disk scanner that connects to a web site directly using direct disk access either locally or through a network.

An example of a web map 100 is shown in FIG. 1. The web map 100 includes nodes 101-105 connected by links 111-115. Nodes 101-103 and 105 are web pages in a web site and node 104 is a web object that is clicked to make a software purchase.

3. Web Traffic Visualization System

Figure 2:
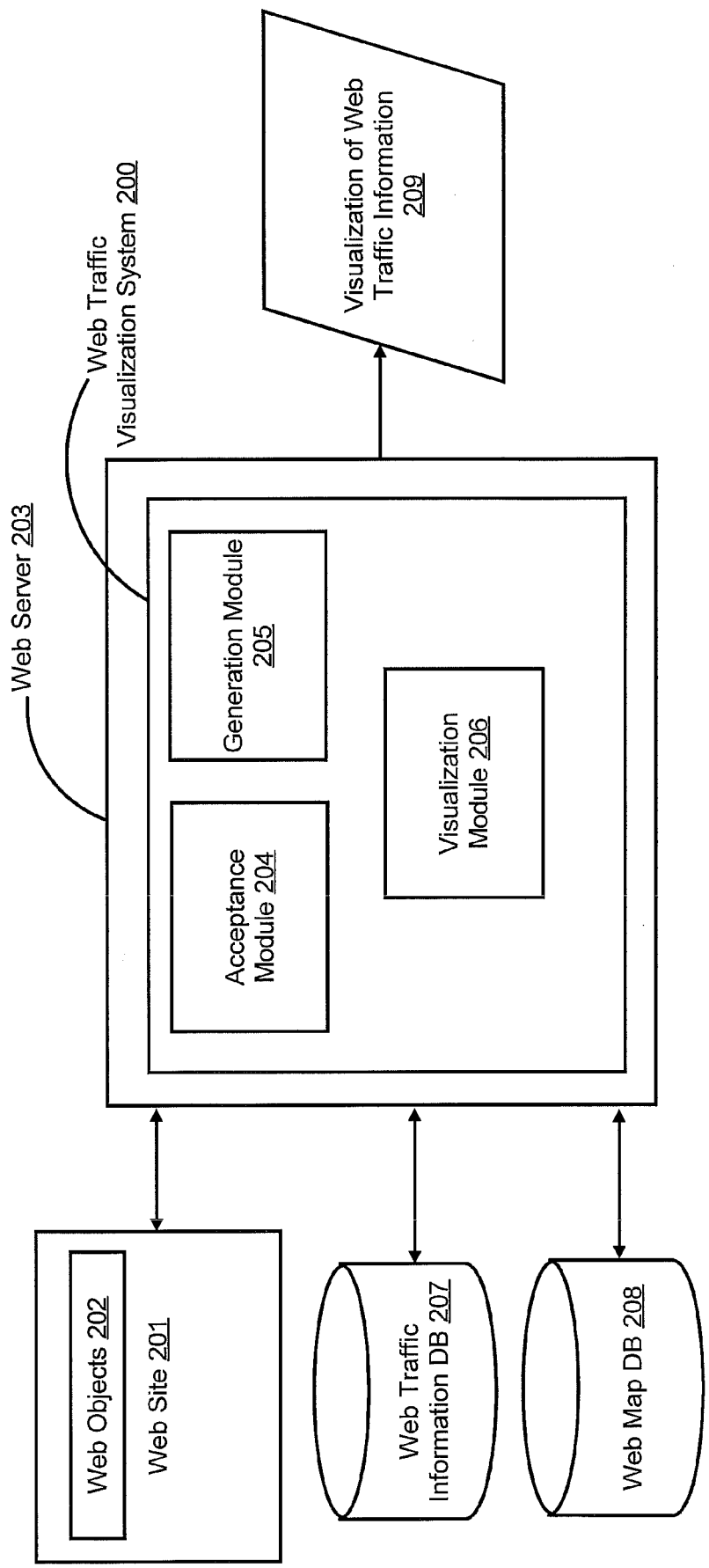
FIG. 2 illustrates a system diagram of a web traffic visualization system, according to an embodiment.

FIG. 2 illustrates a web traffic visualization system 200, according to an embodiment. FIG. 2 shows a web site 201 hosted by a web server 203. The web site 201 includes one or more web objects 202. As discussed above, examples of the web objects 202 include any document that exists on the web site 101.

The web site 201 also includes embedded scripts for each of the web objects 202 individually or for a group of the web objects 202. The scripts, for example, may be JavaScripts, encoded in the web site 201. The scripts may be used to capture and send web traffic information from the web site 201 to a server, such as the web server 203 or another server. The web traffic information may include a visitor action performed on the web objects 202 on the web site 201. A visitor action may include, but is not limited to, going to a URL of a web page, clicking on a web object on a web page, and any other visitor actions that may be performed and statistics that are known to be captured.

The scripts embedded in the web site 201 may instruct the web traffic visualization system 200 on the web server 203 hosting the web site 201, to store the web traffic information for a new visitor in a web traffic information database (DB) 207. For example, a script for a home page may create a unique ID for a new visitor and the unique ID is stored in the web traffic information DB 207. The script for the home page may instruct the web traffic visualization system 200 to capture web traffic information such as metrics on the URL that the visitor came from to the home page and to store the web traffic information in the web traffic information DB 207 with the corresponding visitor's unique ID. For example, a new visitor to the web site 201 clicks on hypertext for products, one of the web objects 202, and the visitor is taken to a products web page. An embedded script for the hypertext web object 202 instructs the web traffic visualization system 200 to store information regarding the fact that the hypertext has been clicked by the visitor and the visitor is now navigating to the products web page. This information is tagged with the unique ID and sent to the web traffic visualization system 200 for storage.

An acceptance module 204 of the web traffic visualization system 200 receives the unique ID of the new visitor and the web traffic information associated with the unique ID transmitted from the web site 201 by the script. The acceptance module 204 stores the web traffic information with the corresponding unique ID in the web traffic information DB 207. As discussed above, the web traffic information may include a visitor action performed on one of the web objects 202 or a group of the web objects 202 when navigating through the web site 201.

A generation module 205 generates a web map for the web site 201, if a web map has not been generated for the web site 201 already. The web map may be generated according to the process described in the in the "Web Map Tool" (U.S. Pat. No. 7,428,705), as discussed above. A web map is a representation of one or more web sites, or parts thereof, including the web objects 202 in the web site 201 and the linking structure associated with the web objects 202. The web map may be stored in a web map database (DB) 208.

A visualization module 206 generates a visualization of the web traffic information 209 on the web map for each visitor. A visualization of web traffic information 209 on a web map includes a visualization of the captured visitor actions associated with a unique ID. For example, once visitor is identified by the acceptance module 204, the web traffic information is stored in the web traffic information DB 207. The web traffic information is also plotted on the web map in addition to being stored. The web traffic information is plotted by matching the web object that the visitor action was performed on from the web traffic information to a web object of the web map. Once the matching web object is found on the web map, an icon or other symbol is generated on the web map to indicate that the visitor performed the visitor action at the web object. The web map is then displayed.

According to an embodiment, information may be displayed using differentiating symbols or designs to distinguish different categories of visitors. For example, as a new visitor is identified as performing an action on a website, a determination is made by the visualization module 206 as to whether the visitor belongs to a predetermined category, which may be based on a visitor profile or other information gathered on the visitor stored in the web traffic information DB 207. If the visitor belongs to a particular category, the visitor is assigned the symbol of the category and the visitor's actions are displayed on the web map with that symbol. Each of multiple categories is given a distinct symbol. Then, by viewing the visualization, a quick determination can be made as to the actions of all the visitors in each category. Each visitor may be represented by a symbol but some of the symbols may be the same if they represent visitors in the same category.

In one embodiment, the visitors' actions for a particular category are aggregated and then displayed. For example, if a majority of the visitors for a category follow a particular path, then a single symbol is shown for all the visitors in that category, and that symbol is shown as following the path. In another embodiment, multiple symbols may be shown for the same category. However, each symbol is representative of multiple visitors performing the same or similar actions. For example, if 35% of the visitors falling in the category of males over 40 years of age perform the same actions, and 40% of the visitors in the same category perform another set of actions, each set is displayed with their own symbol. The symbols may be the same or the symbols may be slightly different but recognizable as representing the same category but different aggregated actions in the same category. Also, in yet another embodiment, each visitor may be represented by a different symbol.

Figure 3:
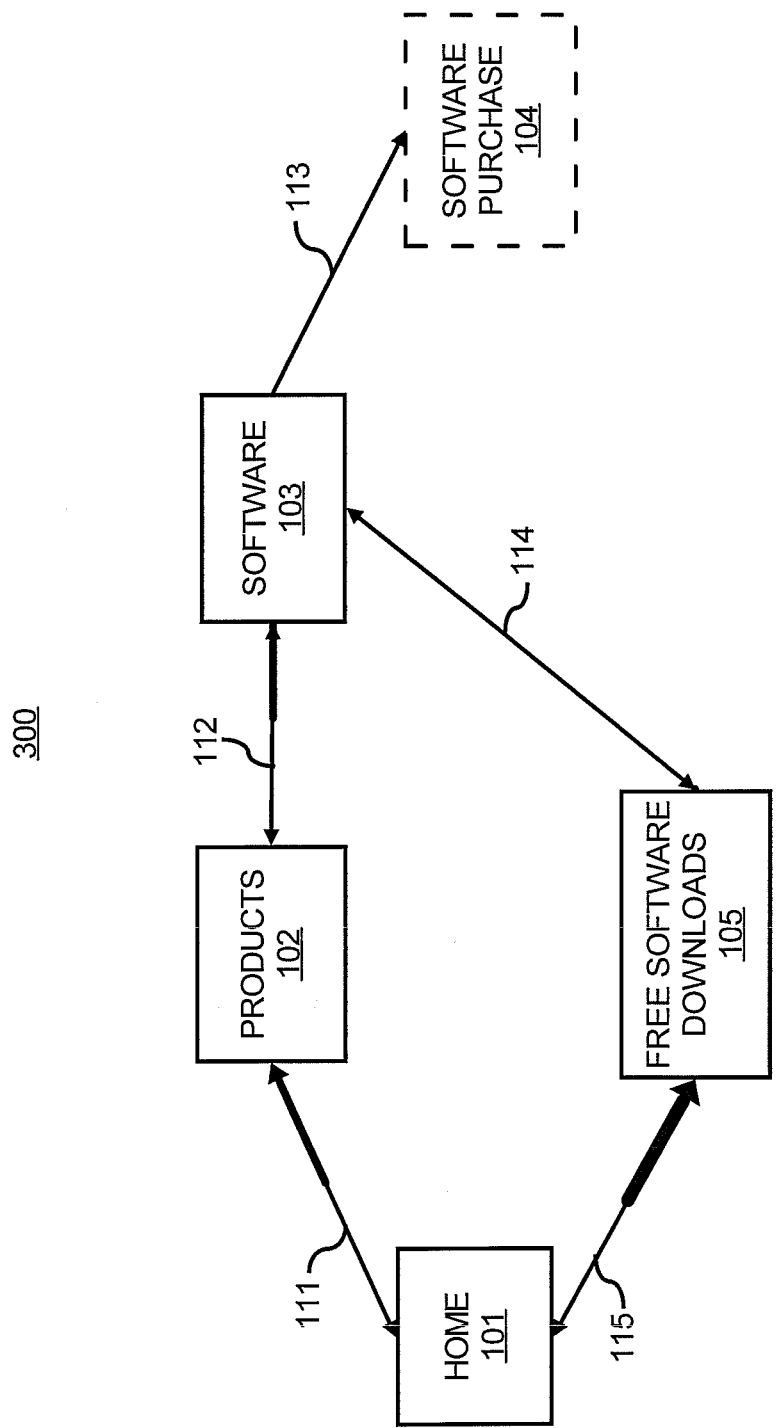
FIG. 3 illustrates an example of web traffic flow displayed on a web map, according to an embodiment.

FIG. 3 illustrates an example of a web traffic visualization generated on the web map 100 of FIG. 1, according to an embodiment. In this example, a width of the arrow is relative to the amount of web traffic to each web object. Other symbols or graphics may be used to represent various web traffic information. For example, single women between 20 and 30 years of age may be visualized as a pink data stream.

As shown in FIG. 3, more traffic goes directly from node 101 to node 105, rather than from node 101 to nodes 102 and 103, and then to node 105. Thus, if the web site owner desires visitors to view the software products at node 103, the web site owner may remove the direct path from node 101 to 105.

Based on the real-time visualization generated by the web map server, different actions may be taken. For example, a volume of traffic can be seen as it progresses through different paths. Bottlenecks can be identified and corrected, which may reduce response times of the web server 203 and improve the visitors' experiences. The web site 201 may be reconfigured to correct bottlenecks or to drive visitors to different web objects 202 not currently receiving enough hits.

4. Method

Figure 4:
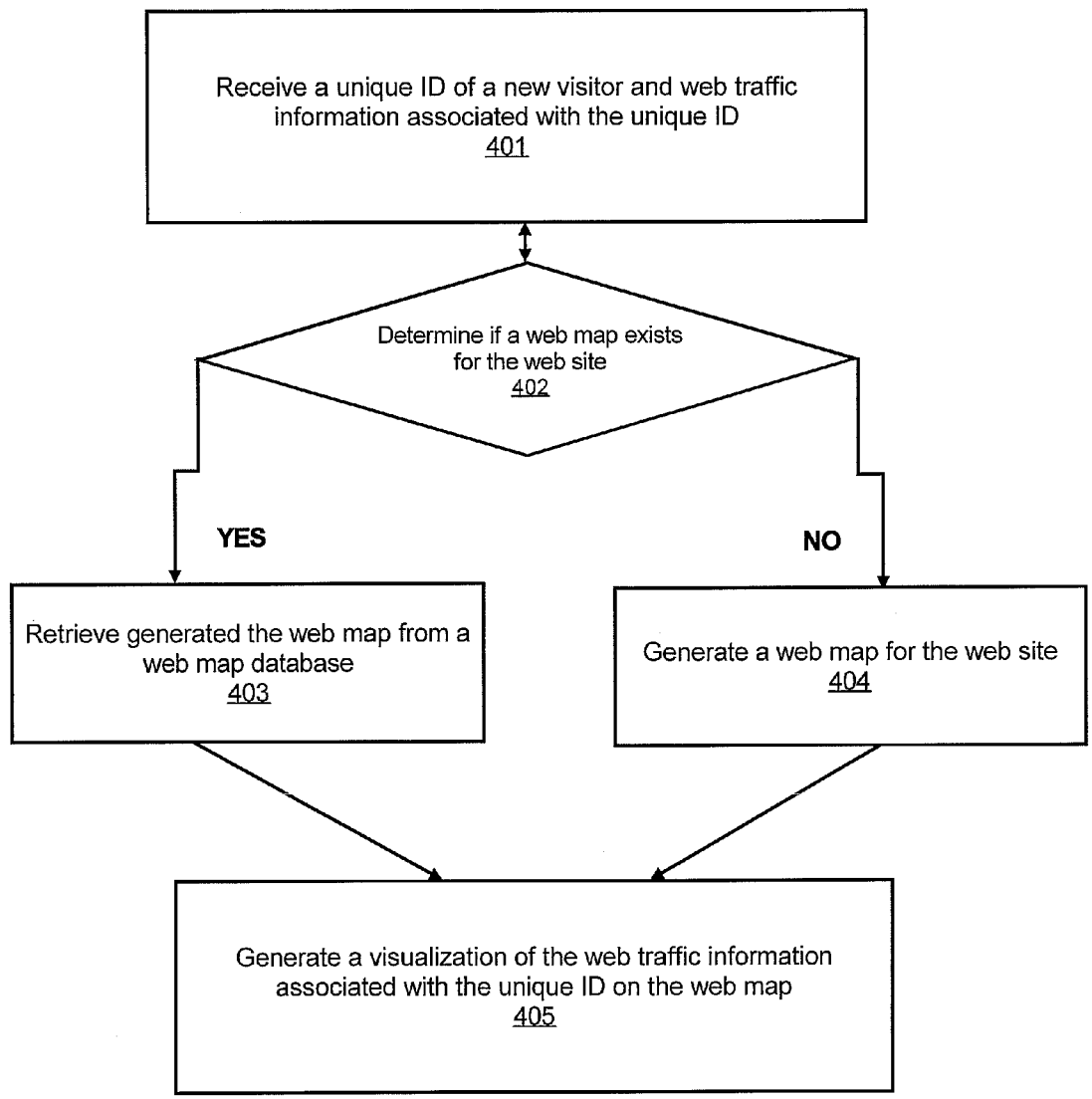
FIG. 4 illustrates a method for generating a visualization of web traffic information for a web site, according to an embodiment.

FIG. 4 illustrates a method 400 for generating a visualization of web traffic information for a web site, according to an embodiment. The method 400 and other methods and steps described herein may be described with respect to FIGS. 1-3 by way of example and not limitation.

At step 401, the web traffic visualization system 200 receives a unique ID of a new visitor and web traffic information associated with the unique ID transmitted from a web site by a script embedded in a web site. The web traffic visualization system 200 stores the web traffic information with the corresponding unique ID in a web traffic information database. As discussed above, the web traffic information may include a visitor action performed on a web object when navigating through the web site. The visitor action may include, but is not limited to, going to a URL of a web page, clicking on a web object on a web page, and any other conventional statistics that are known to be captured.

At step 402, the web traffic visualization system 200 determined if a web map for the web site has been generated. If a web map has been generated, the process proceeds to step 403. At step 403, the generated web map is retrieved from a web page database and the process proceeds to step 405.

At step 402, if it is determined the web traffic visualization system has not generated a web map for the web site, the process proceeds to step 404. At step 404, the web traffic visualization system generates a web map for the web site.

The web map may be generated as described in the in the "Web Map Tool" (U.S. Pat. No. 7,428,705), as discussed above. A web map is a representation of one or more web sites, or parts thereof, including web objects in the web site and a linking structure associated with the web objects. The web map may be stored in the web map database. The process than proceeds to step 405.

At step 405, the web traffic visualization system 200 generates a visualization of the web traffic information on the web map. A visualization of the web traffic information on the web map includes a visualization of the captured visitor action associated with the unique ID of the visitor. For example, once visitor is identified, the web traffic information is stored in the web traffic information database. The web traffic information is also plotted on the web map in addition to being stored. The web traffic information is plotted by matching the web object that the visitor action was performed on from the web traffic information to a web object of the web map. Once the matching web object is found on the web map, an icon or other symbol is generated on the web map to indicate that the visitor performed the visitor action at the web object. The web map is then displayed.

Other symbols or graphics may be used to represent various web traffic information. According to an embodiment, information may be displayed using differentiating symbols or designs to distinguish different categories of visitors. For example, as a new visitor is identified as performing an action on a web site, and a determination is made as to whether the visitor belongs to a predetermined category, which may be based on a visitor profile or other information gathered on the visitor. If the visitor belongs to a particular category, the visitor is assigned the symbol of the category and the visitor's actions are displayed on the web map with that symbol. Each of multiple categories is given a distinct symbol. Then, by viewing the visualization, a quick determination can be made as to the actions of all the visitors in each category. Each visitor may be represented by a symbol but some of the symbols may be the same if they represent visitors in the same category.

In one embodiment, the visitors' actions for a particular category are aggregated and then displayed. For example, if a majority of the visitors for a category follow a particular path, then a single symbol is shown for all the visitors in that category, and that symbol is shown as following the path. In another embodiment, multiple symbols may be shown for the same category. However, each symbol is representative of multiple visitors performing the same or similar actions. Also, in yet another embodiment, each visitor may be represented by a different symbol.

Scripts are provided for each web object and this process is repeated for each visitor action of each visitor so the web map server can generate a real-time visualization of web traffic for each visitor simultaneously.

5. Computer System

Figure 5:
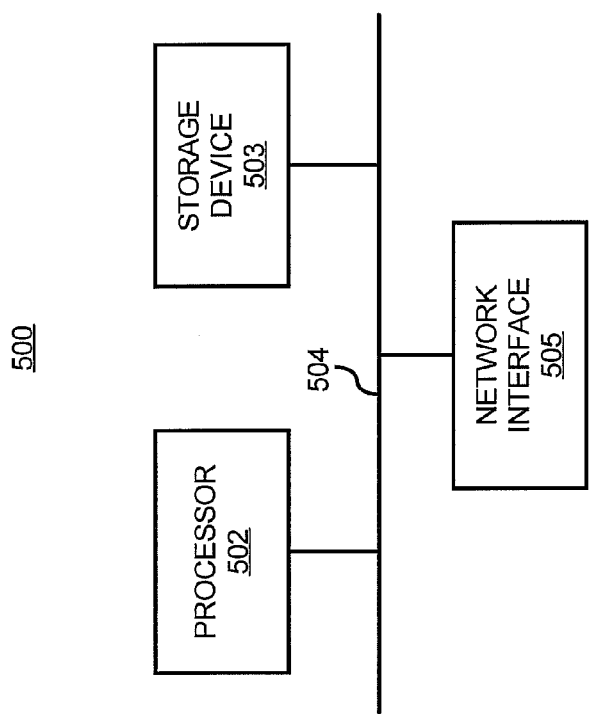
FIG. 5 illustrates a computer system operating as a hardware platform for the web traffic visualization system described herein, according to an embodiment.

FIG. 5 shows a computer system 500 that may be used as a hardware platform for the web traffic visualization system 200. The computer system 500 may be used as a platform for executing one or more of the steps, methods, and functions described herein that may be embodied as software stored on one or more computer readable storage devices, which are hardware storage devices.

The computer system 500 includes a processor 502 or processing circuitry that may implement or execute software instructions performing some or all of the methods, functions and other steps described herein. Commands and data from the processor 502 are communicated over a communication bus 504. The computer system 500 also includes a non-transitory computer readable medium, such as storage device 503, which may be random access memory (RAM) where the software and data for processor 502 may reside during runtime. The storage device 503 may also include non-volatile data storage. The computer system 500 may include a network interface 505 for connecting to a network. It will be apparent to one of ordinary skill in the art that other known electronic components may be added or substituted in the computer system 500.

While the embodiments have been described with reference to examples, those skilled in the art will be able to make various modifications to the described embodiments without departing from the scope of the claimed embodiments. Also, the embodiments described herein may be used to map other types of activity on a web site or map user activity in a software program.

What is claimed is:

1. A web traffic visualization system, comprising:
 a generation module to generate a web map including web objects and links connecting the web objects, wherein the web objects are for a web site;
 an acceptance module to assign a unique ID to a visitor of the web site and receive a visitor action performed by the visitor on a web object in the web site tagged with the unique ID; and
 a visualization module, executed by a computer system, to:
  determine whether the visitor belongs to a predetermined category and assign the visitor a symbol of the predetermined category to which the visitor belongs; and
  generate and display the visitor action on the web map in response to receiving the visitor action tagged with the unique ID,
 wherein the visitor action for different visitors is displayed using differentiating symbols to distinguish different categories of visitors.

2. The web traffic visualization system of claim 1, wherein the web map is to be updated with additional visitor actions tagged with the unique ID.

3. The web traffic visualization system of claim 1, wherein the web objects include any document that exists on the web site.

4. The web traffic visualization system of claim 1, wherein the web objects include plain text, hypertext, images, audio, video and other multimedia objects, executable applications and database information.

5. The web traffic visualization system of claim 1, wherein the visualization module is further to aggregate the visitors' actions for a particular category.

6. A method for generating a visualization of web traffic information for a web site, comprising:
 generating, by a hardware processor, a web map including web objects and links connecting the web objects, wherein the web objects are for a web site;
 assigning, by the hardware processor, a unique ID to a visitor of the web site;
 receiving, by the hardware processor, web traffic information pertaining to a visitor action performed by the visitor on a web object in the web site;
 tagging the visitor action with the unique ID;
 generating, by the hardware processor, the visitor action on the web map in response to receiving the visitor action tagged with the unique ID;
 determining, by the hardware processor, whether the visitor belongs to a predetermined category and assigning the visitor a symbol of the predetermined category to which the visitor belongs and;
 displaying the visitor action on the web map,
 wherein the visitor action for different visitors is displayed using differentiating symbols to distinguish different categories of visitors.

7. The method of claim 6, wherein the web map is updated with additional visitor actions tagged with the unique ID.

8. The method of claim 6, wherein the web objects include any document that exists on the web site.

9. The method of claim 6, wherein the web objects include plain text, hypertext, images, audio, video and other multimedia objects, executable applications and database information.

10. The method of claim 6, further comprising aggregating the visitor's visitor actions for a particular category.

11. A non-transitory computer readable medium having stored thereon computer executable instructions for generating a visualization of web traffic information for a web site, the computer executable instructions, when executed, cause a computer system to:
 generate a web map including web objects and links connecting the web objects, wherein the web objects are for a web site;
 assign a unique ID to a visitor of the web site;
 receive a visitor action performed by the visitor on a web object in the web site, the visitor action tagged with the unique ID;
 generate the visitor action on the web map in response to receiving the visitor action tagged with the unique ID;
 determine whether the visitor belongs to a predetermined category and assigning the visitor a symbol of the predetermined category to which the visitor belongs; and
 display the visitor action on the web,
 wherein the visitor action for different visitors is displayed using differentiating symbols or designs to distinguish different categories of visitors; and
 wherein the computer readable medium comprises a storage device.

12. The computer readable medium of claim 11, wherein the web map is updated with additional visitor actions tagged with the unique ID.

13. The computer readable medium of claim 11, wherein the web objects include any document that exists on the web site.

14. The computer readable medium of claim 11, wherein the web objects include plain text, hypertext, images, audio, video and other multimedia objects, executable applications and database information.

* * * * *